| (12) | United States Patent | (10) Patent No.: | US 7,882,108 B2 |
|---|---|---|---|
| | Rychener | (45) Date of Patent: | *Feb. 1, 2011 |

(54) DYNAMICALLY UPDATING A WEBSHEET CONFIGURATION

(75) Inventor: Michael David Rychener, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 188 days.

This patent is subject to a terminal disclaimer.

(21) Appl. No.: 12/356,150

(22) Filed: Jan. 20, 2009

(65) Prior Publication Data

US 2009/0138449 A1 May 28, 2009

Related U.S. Application Data

(63) Continuation of application No. 11/235,774, filed on Sep. 27, 2005, now Pat. No. 7,505,977.

(51) Int. Cl.
*G06F 17/30* (2006.01)

(52) U.S. Cl. .................. 707/736; 715/206; 715/207; 715/212; 715/222; 715/223; 715/225; 715/235; 715/237

(58) Field of Classification Search .................. None
See application file for complete search history.

(56) References Cited

U.S. PATENT DOCUMENTS

| 5,418,902 | A | 5/1995 | West et al. |
|---|---|---|---|
| 6,549,878 | B1 | 4/2003 | Lowry et al. |
| 6,691,281 | B1 * | 2/2004 | Sorge et al. .................. 715/234 |
| 2002/0065846 | A1 | 5/2002 | Ogawa et al. |
| 2002/0129054 | A1 | 9/2002 | Ferguson et al. |
| 2003/0154197 | A1 | 8/2003 | Millet et al. |
| 2003/0182463 | A1 | 9/2003 | Valk |
| 2003/0182621 | A1 | 9/2003 | Mazza et al. |
| 2004/0172592 | A1 * | 9/2004 | Collie et al. ................. 715/503 |
| 2004/0181748 | A1 * | 9/2004 | Jamshidi et al. ............. 715/503 |

(Continued)

OTHER PUBLICATIONS

Notice of Allowance (Mail Date Oct. 31, 2008) for U.S. Appl. No. 11/235,774, filed Sep. 27, 2005, Confirmation No. 5670.

(Continued)

*Primary Examiner*—Neveen Abel Jalil
*Assistant Examiner*—Farhan M Syed
(74) *Attorney, Agent, or Firm*—Schmeiser, Olsen & Watts; John R. Pivnichny

(57) ABSTRACT

A system and computer program product for updating a configuration of a websheet. A client receives a web page including the websheet from a server. The websheet includes data values stored in a relational database table. The table includes a first set of data values displayed in cells of the websheet in response to the client receiving the web page. The table also includes a second set of data values associated with the websheet configuration. Second set data values are not displayed in the websheet in response to the client receiving the web page. A form displaying the second set is received by the client. Second set data values are updated on the form to provide an updated websheet configuration. With its updated configuration, the websheet is displayed at the client and allows data entry to modify or add first set data values.

20 Claims, 9 Drawing Sheets

U.S. PATENT DOCUMENTS

2004/0216038 A1 10/2004 Liu et al.
2004/0243929 A1* 12/2004 Jones et al. .................. 715/509
2005/0015714 A1 1/2005 Cahill et al.
2005/0066265 A1 3/2005 Kotler et al.
2005/0108623 A1* 5/2005 Bedford et al. ............. 715/503
2006/0129913 A1* 6/2006 Vigesaa et al. .............. 715/503

OTHER PUBLICATIONS

Morris, Charlie; Internet-based Real-time Quote Systems; [online]; [Retrieved Feb. 8, 2005]; Retrieved from the Internet <URL: http://www.webdevelopersjournal.com/software/quote_systems.html>; 15 pages.

Excel Everywhere—Create calculators and forms for the web; [online]; [Retrieved Sep. 2, 2005]; Retrieved from the Internet <URL:http:www.exceleverywhere.com>; 2 pages.

EBA Grid Control V2—Version 2.0; [online]; [Retrieved Sep. 2, 2005]; Retrieved from the Internet <URL: http://netdownload.smesource.com/downloads/product.cfm/PID/12493/Software/EBA:Grid_Control_V2>; 2 pages.

* cited by examiner

230

| COLUMN NAME | DATA TYPE | COMMENT |
|---|---|---|
| ROWINDEX | INTEGER | UNIQUE ROW KEY (FOREIGN KEY) |
| COLUMNINDEX | INTEGER | UNIQUE COLUMN (FOREIGN KEY) |
| SHEETID | INTEGER | UNIQUE SHEET (FOREIGN KEY) |
| BUSINESSUNITID | INTEGER | UNIQUE BUSINESS UNIT (FOREIGN KEY) |
| LABEL | VARCHAR 5 | A01, A02, , B01, B02, |
| INT_VALUE | INTEGER | NULLABLE |
| STR_VALUE | VARCHAR 240 | NULLABLE |
| DATE_VALUE | DATE | NULLABLE |
| FLOAT_VALUE | FLOAT | NULLABLE |
| SCRIPT_VALUE | VARCHAR 240 | NULLABLE EXPRESSION THAT CAN BE USED FOR DATA VALIDATION, ETC. |
| DATATYPE | CHARACTER 1 | I (INTEGER), S (STRING), D (DATE), ETC. |
| DISPLAYTYPE | CHARACTER 1 | G (GENERAL), Y (YES/NO), ETC. |
| MODIFIABLE | CHARACTER 1 | Y OR N |

| COLUMN NAME | DATA TYPE | COMMENT |
|---|---|---|
| SHEETID | INTEGER | KEY |
| SHEETLABEL | VARCHAR 32 | |
| PAGEID | INTEGER | |
| NUMROWS | INTEGER | |
| NUMCOLUMNS | INTEGER | |

| COLUMN NAME | DATA TYPE | COMMENT |
|---|---|---|
| PAGEID | INTEGER | KEY |
| PAGELABEL | VARCHAR 32 | |

*FIG. 2D*

| Inventory Counts | WGT US # of widgets | WGT AP # of widgets | WGT LA # of widgets | WGT Canada # of widgets | WGT EMEA # of widgets | WGT Recognized Exceptions # of widgets | Worldwide WGT Results # of widgets | Non-WGT # of widgets |
|---|---|---|---|---|---|---|---|---|
| Total Inventory | 2000 | 1000 | 1100 | 3000 | 3500 | 10600 | 10600 | 5300 |
| Inventory Validated | 1917 | 900 | 990 | 2910 | 3333 | 111 | 10050 | 5100 |
| # Compliant | 1617 | 800 | 810 | 2810 | 2222 | 111 | 8370 | 5000 |
| Compliance % | 84 | 89 | 82 | 97 | 67 | 100 | 83 | 98 |

280

Save All Changes    Cancel Typing Changes

| Business Unit | Template Number | Row | Column | Label |
|---|---|---|---|---|
| -1 | 201 | 5 | 2 | B5 |

| Integer Value | Real Value | Date Value |
|---|---|---|
| 1617 | | NoDate04 |

| String Value | "" |
|---|---|
| Formula | [ ] |

| Modifiable? | Display Type | Date Type |
|---|---|---|
| Y | G | i |

[ Previous Row ] [ Next Row ]
[ Previous Column ] [ Next Column ]
[ Previous Sheet ] [ Next Sheet ]
[ Previous Business Unit ] [ Next Business Unit ]

| Full Row of Values | |
|---|---|
| 12 | 5000 |
| 11 | |
| 10 | 8370 |
| 9 | |
| 8 | 111 |
| 7 | |
| 6 | 2222 |
| 5 | 2810 |
| 4 | 810 |
| 3 | 800 |
| 2 | 1617 |
| 1 | # Compliant |

| Business Unit | Template Number | Row | Column | Label |
|---|---|---|---|---|
| -1 | 201 | 7 | 2 | B7 |

| Integer Value | Real Value | Date Value |
|---|---|---|
| 7777 | | NoDate04 |

| String Value |
|---|
| "" |

| Formula |
|---|
| [ ] |

| Modifiable? | Display Type | Date Type |
|---|---|---|
| N | G | i |

[ Previous Row ]    [ Next Row ]
[ Previous Column ] [ Next Column ]
[ Previous Sheet ]  [ Next Sheet ]
[ Previous Business Unit ] [ Next Business Unit ]

| Full Row of Values | |
|---|---|
| 2 | 7777 |
| 1 | Test |

| Inventory Counts | WGT US | WGT AP | WGT LA | WGT Canada | WGT EMEA | WGT Recognized Exceptions | Worldwide WGT Results | Non-WGT |
| --- | --- | --- | --- | --- | --- | --- | --- | --- |
| | # of widgets | # of widgets | # of widgets | # of widgets | # of widgets | # of widgets | # of widgets | # of widgets |
| Total Inventory | 2000 | 1000 | 1100 | 3000 | 3500 | 10600 | 10600 | 5300 |
| Inventory Validated | 1917 | 900 | 990 | 2910 | 3333 | 111 | 10050 | 5100 |
| # Compliant | 1617 | 800 | 810 | 2810 | 2222 | 111 | 8370 | 5000 |
| Compliance % | 84 | 89 | 82 | 97 | 67 | 100 | 83 | 98 |
| Test | 7777 | | | | | | | |

[ Save All Changes ]  [ Cancel Typing Changes ]

DYNAMICALLY UPDATING A WEBSHEET CONFIGURATION

This application is a continuation application claiming priority to Ser. No. 11/235,774, filed Sep. 27, 2005.

FIELD OF THE INVENTION

The present invention relates to a method and system for dynamically updating a websheet, and more particularly to a technique for dynamically updating a configuration of the websheet by a remote end user.

BACKGROUND OF THE INVENTION

Conventional websheet applications provide end users with limited spreadsheet capabilities, but lack easy-to-use tools for dynamically modifying the layout, calculation formulas and database storage aspects of the websheet. Thus, there is a need for an improved technique for dynamic modification of websheets by end users.

SUMMARY OF THE INVENTION

In first embodiments, the present invention provides a method of updating a configuration of a websheet in a network computing environment, the method comprising:

receiving, at a client computing unit via a browser running on the client computing unit, a web page having the websheet from a server computing unit, the websheet comprising a plurality of cells, each cell being associated with multiple data values of a plurality of data values, wherein the plurality of data values is stored in a table of a relational database and comprises:
  a first set of data values displayed on the websheet at the client computing unit in response to the client computing unit receiving the web page, and
  a second set of data values associated with the configuration of the websheet, the second set not being displayed on the websheet at the client computing unit in response to the client computing unit receiving the web page,
  wherein a cell of the plurality of cells includes a data value of the first set and is associated with at least one data value of the second set;

receiving, at the client computing unit via the browser, a data value input form from the server computing unit, the data value input form displaying the second set via a first query of the database;

updating one or more data values of the second set, the updating comprising:
  utilizing the data value input form at the client computing unit; and
  providing an updated configuration of the websheet via a second query of the database; and displaying the websheet at the client computing unit via the browser, wherein the websheet has the updated configuration and displays the first set, wherein an entry on the websheet having the updated configuration is capable of modifying a data value of the first set or adding a new data value to the first set.

In second embodiments, the present invention provides a system for updating a configuration of a websheet in a network computing environment, the system comprising:

means for receiving, at a client computing unit via a browser running on the client computing unit, a web page having the websheet from a server computing unit, the websheet comprising a plurality of cells, each cell being associated with multiple data values of a plurality of data values, wherein the plurality of data values is stored in a table of a relational database and comprises:
  a first set of data values displayed on the websheet at the client computing unit in response to the client computing unit receiving the web page, and
  a second set of data values associated with the configuration of the websheet, the second set not being displayed on the websheet at the client computing unit in response to the client computing unit receiving the web page,
  wherein a cell of the plurality of cells includes a data value of the first set and is associated with at least one data value of the second set;

means for receiving, at the client computing unit via the browser, a data value input form from the server computing unit, the data value input form displaying the second set via a first query of the database;

means for updating one or more data values of the second set, the means for updating comprising:
  means for utilizing the data value input form at the client computing unit; and
  means for providing an updated configuration of the websheet via a second query of the database; and means for displaying the websheet at the client computing unit via the browser, wherein the websheet has the updated configuration and displays the first set, wherein an entry on the websheet having the updated configuration is capable of modifying a data value of the first set or adding a new data value to the first set.

In third embodiments, the present invention provides a computer program product comprising a computer-usable medium including computer-usable program code for updating a configuration of a websheet, the computer program product including:

computer-usable code for receiving, at a client computing unit via a browser running on the client computing unit, a web page having the websheet from a server computing unit, the websheet comprising a plurality of cells, each cell being associated with multiple data values of a plurality of data values, wherein the plurality of data values is stored in a table of a relational database and comprises:
  a first set of data values displayed on the websheet at the client computing unit in response to the client computing unit receiving the web page, and
  a second set of data values associated with the configuration of the websheet, the second set not being displayed on the websheet at the client computing unit in response to the client computing unit receiving the web page,
  wherein a cell of the plurality of cells includes a data value of the first set and is associated with at least one data value of the second set;

computer-usable code for receiving, at the client computing unit via the browser, a data value input form from the server computing unit, the data value input form displaying the second set via a first query of the database;

computer-usable code for updating one or more data values of the second set, the updating comprising:
  computer-usable code for utilizing the data value input form at the client computing unit; and
  computer-usable code for providing an updated configuration of the websheet via a second query of the database; and computer-usable code for displaying the websheet at the client computing unit via the browser, wherein the websheet has the updated configuration and displays the first set, wherein an entry on the websheet having the updated configuration is capable of modifying a data value of the first set or adding a new data value to the first set.

In fourth embodiments, the present invention provides a method for deploying computing infrastructure, comprising integrating computer-readable code into a computing system, wherein the code in combination with the computing system is capable of performing a process of updating a configuration of a websheet in a network computing environment, the process comprising:

receiving, at a client computing unit via a browser running on the client computing unit, a web page having the websheet from a server computing unit, the websheet comprising a plurality of cells, each cell being associated with multiple data values of a plurality of data values, wherein the plurality of data values is stored in a table of a relational database and comprises:

a first set of data values displayed on the websheet at the client computing unit in response to the client computing unit receiving the web page, and a second set of data values associated with the configuration of the websheet, the second set not being displayed on the websheet at the client computing unit in response to the client computing unit receiving the web page, wherein a cell of the plurality of cells includes a data value of the first set and is associated with at least one data value of the second set;

receiving, at the client computing unit via the browser, a data value input form from the server computing unit, the data value input form displaying the second set via a first query of the database;

updating one or more data values of the second set, the updating comprising:

utilizing the data value input form at the client computing unit; and providing an updated configuration of the websheet via a second query of the database; and displaying the websheet at the client computing unit via the browser, wherein the websheet has the updated configuration and displays the first set, wherein an entry on the websheet having the updated configuration is capable of modifying a data value of the first set or adding a new data value to the first set.

Advantageously, the present invention provides an end user with a single, easy-to-use tool allowing dynamic modification of layout, calculation formulas and data values in cells of a websheet. Websheet layout modification is completed on a form presented using an intuitive spreadsheet model on a web browser. An existing body of calculation and display techniques is re-used by specifying novel behind-the-scenes data values, thereby avoiding the need for customized coding of spreadsheet applications or other programming skills. Instead of customizing a websheet layout with calculations, the end user selects data values on a form.

BRIEF DESCRIPTION OF THE DRAWINGS

FIG. 2B is a table defining attributes of the websheet displayed by the process of FIG. 2A, in accordance with embodiments of the present invention.

FIG. 2C is a table defining a sheet associated with the attributes defined in FIG. 2B, in accordance with embodiments of the present invention.

FIG. 2D is a table defining a page associated with the sheet defined in FIG. 2C, in accordance with embodiments of the present invention.

FIG. 2E is a screen including a websheet displayed by the process of FIG. 2A, in accordance with embodiments of the present invention.

FIG. 3B is a screen including a data value input form displaying updateable configuration data values and cell data values of the websheet of FIG. 2E, in accordance with embodiments of the present invention.

FIG. 3D is a screen including the websheet of FIG. 2E after the configuration of the websheet is updated according to the data value input form of FIG. 3C, in accordance with embodiments of the present invention.

DETAILED DESCRIPTION OF THE INVENTION

The present invention provides a technique for remotely and dynamically updating the configuration of a websheet by utilizing code that interprets data values of a relational database table. The data values are associated with the layout of a websheet, and with the appearance, calculations, and displayed contents of cells of a websheet. As used herein, a websheet is defined as a spreadsheet-like collection of cells organized in rows and columns, which automatically displays real-time data from a remote database via a network (e.g., the Internet), rather than data from a user's local file. The updating of the websheet configuration provided by the present invention includes updating the number of rows and/or columns of the websheet, the headers of the rows and/or columns, the type of data that is permitted in a cell, the formulas used to calculate values displayed in cells, an attribute identifying whether a data value is modifiable, and any other attribute related to the appearance or visual layout of a single cell of the websheet or of the websheet as a whole.

Figure 1:
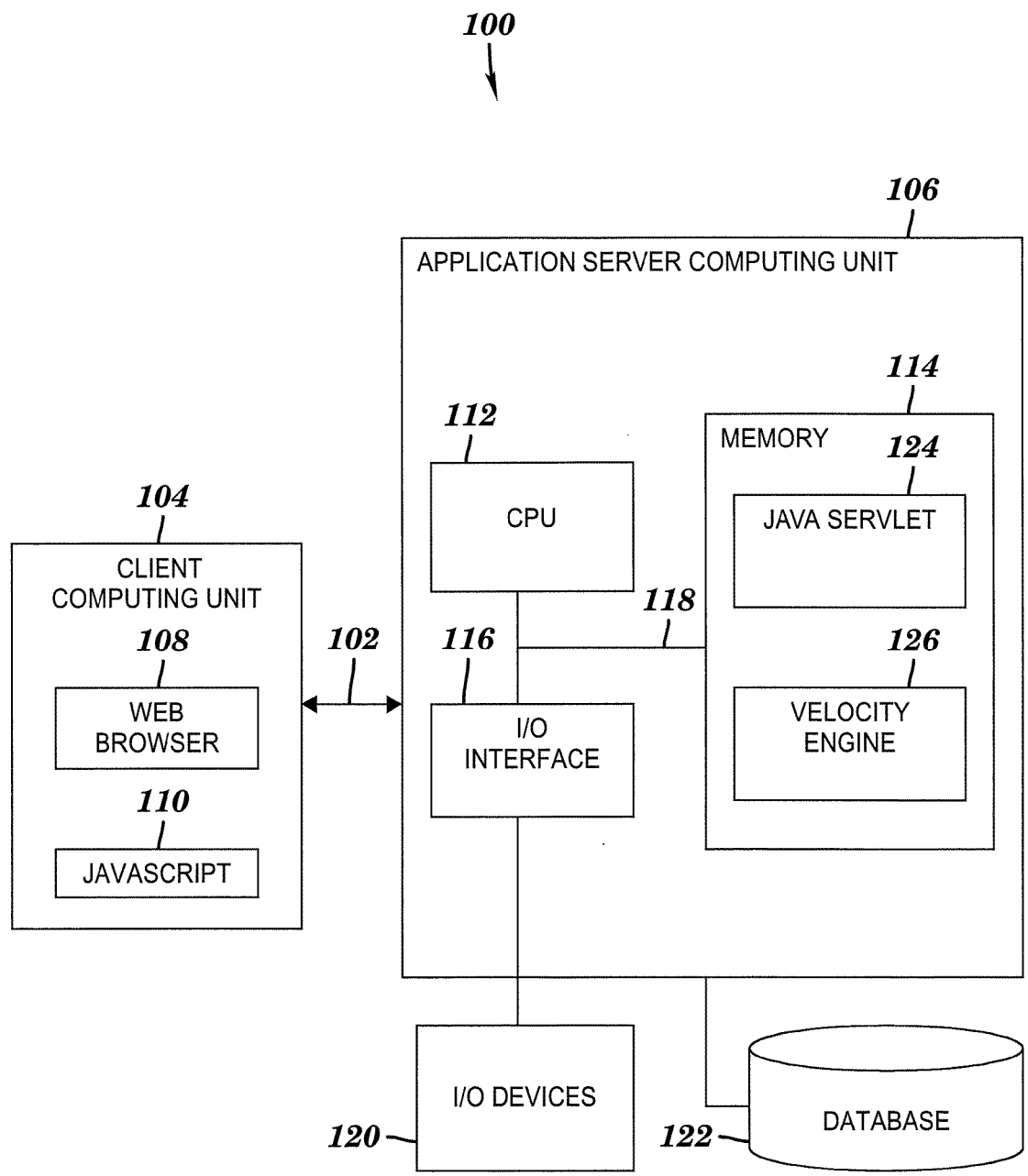
FIG. 1 is a block diagram of a system for updating a configuration of a websheet, in accordance with embodiments of the present invention.

FIG. 1 is a block diagram of a system 100 for updating a configuration of a websheet, in accordance with embodiments of the present invention. FIG. 1 depicts a system 100 for communicating over a network 102. In particular, an end user's computing unit 104 (i.e., a client computing unit) and a server computing unit 106 communicate over network 102. Network 102 can comprise any type of communications link. For example, network 102 can comprise an addressable connection in a client-server environment that may utilize any combination of wireline and/or wireless transmission methods. Server 106 and client 104 utilize conventional network connectivity (e.g., Ethernet, Token Ring, or WiFi). Further, network 102 comprises any type of network, including the Internet, a wide area network (WAN), a local area network (LAN), or a virtual private network (VPN). Although not shown, the network environment provided by network 102 can connect multiple clients similar to client 104 and multiple servers similar to server 106.

Client computing unit 104 includes a web browser (e.g., Microsoft® Internet Explorer®) 108 by which a user of client computing unit 104 may access a websheet or a data value input form. For example, the user may utilize browser 108 to select a link to display the websheet or the data value input form at client 104. Client 104 also includes one or more functions (e.g., JavaScript® functions) supporting calculations in websheets and data value input forms. Although not shown, client computing system 104 typically includes components (e.g., central processing unit, memory, etc.) similar to components of server computing unit 106, which are described below.

Server computing unit 106 generally comprises a central processing unit (CPU) 112, a memory 114, an input/output (I/O) interface 116, a bus 118, I/O devices 120 and a database 122. CPU 112 performs computation and control functions of server 106. CPU 112 may comprise a single processing unit, or be distributed across one or more processing units in one or more locations (e.g., on a client and server). Memory 114 may comprise any known type of data storage and/or transmission media, including magnetic media, optical media, random access memory (RAM), read-only memory (ROM), a data cache, a data object, etc. Database 122 is stored on any type of storage unit, such as a magnetic disk drive or an optical disk drive. Database 122 is a relational database storing data values that determine the configuration of a websheet. Moreover, similar to CPU 112, memory 114 and/or database 122 may reside at a single physical location, comprising one or more types of data storage, or be distributed across a plurality of physical systems in various forms. Further, memory 114 and/or database 122 can include data distributed across, for example, a LAN, WAN or storage area network (SAN) (not shown).

I/O interface 116 comprises any system for exchanging information to or from an external source. I/O devices 120 comprise any known type of external device, including a display monitor, keyboard, mouse, printer, speakers, handheld device, printer, facsimile, etc. Bus 118 provides a communication link between each of the components in server 106, and may comprise any type of transmission link, including electrical, optical, wireless, etc.

I/O interface 116 also allows server 106 to store and retrieve information (e.g., program instructions or data) from an auxiliary storage device, such as a non-volatile storage device (e.g., a CD-ROM drive which receives a CD-ROM disk) (not shown). Server 106 can store and retrieve information from other auxiliary storage devices (not shown), which can include a direct access storage device (DASD) (e.g., hard disk or floppy diskette), a magneto-optical disk drive, a tape drive, or a wireless communication device.

Server 106 comprises any type of computing unit capable of communicating with one or more other computing units (e.g., client 104). Server 106 is, for example, a WebSphere® server available from International Business Machines Corporation of Armonk, N.Y.

Similarly, client 104 comprises any type of computing unit capable of communicating with server 106 and connecting with database 122 via network 102. Examples of client computing unit 104 include a personal computer, laptop computer, handheld device, mobile phone, etc.

Memory 114 includes computer program code comprising a websheet configuration update system that includes a servlet 124 that runs, for example, on the Java® 2 Platform (e.g., Java® 2 Platform, Enterprise Edition or J2EE®) and a template engine such as a Velocity engine 126. Velocity is an open source Java®-based template engine that converts templates to HyperText Markup Language (HTML), text, extensible markup language (XML), SQL, PostScript®, etc., and is available from the Apache Software Foundation of Forest Hill, Md. Java® servlet 124 extracts data values from tables in database 122 and assembles data structures (not shown).

Velocity engine 126 provides macros that use the assembled data structures to render a display of a websheet or a data value input form at client computing unit 104 (see FIG. 1) via web browser 108 (see FIG. 1). Further, memory 114 may include other systems not shown in FIG. 1, such as an operating system (e.g., Linux) that runs on CPU 112 and provides control of various components within and/or connected to server 106.

Figure 2A:
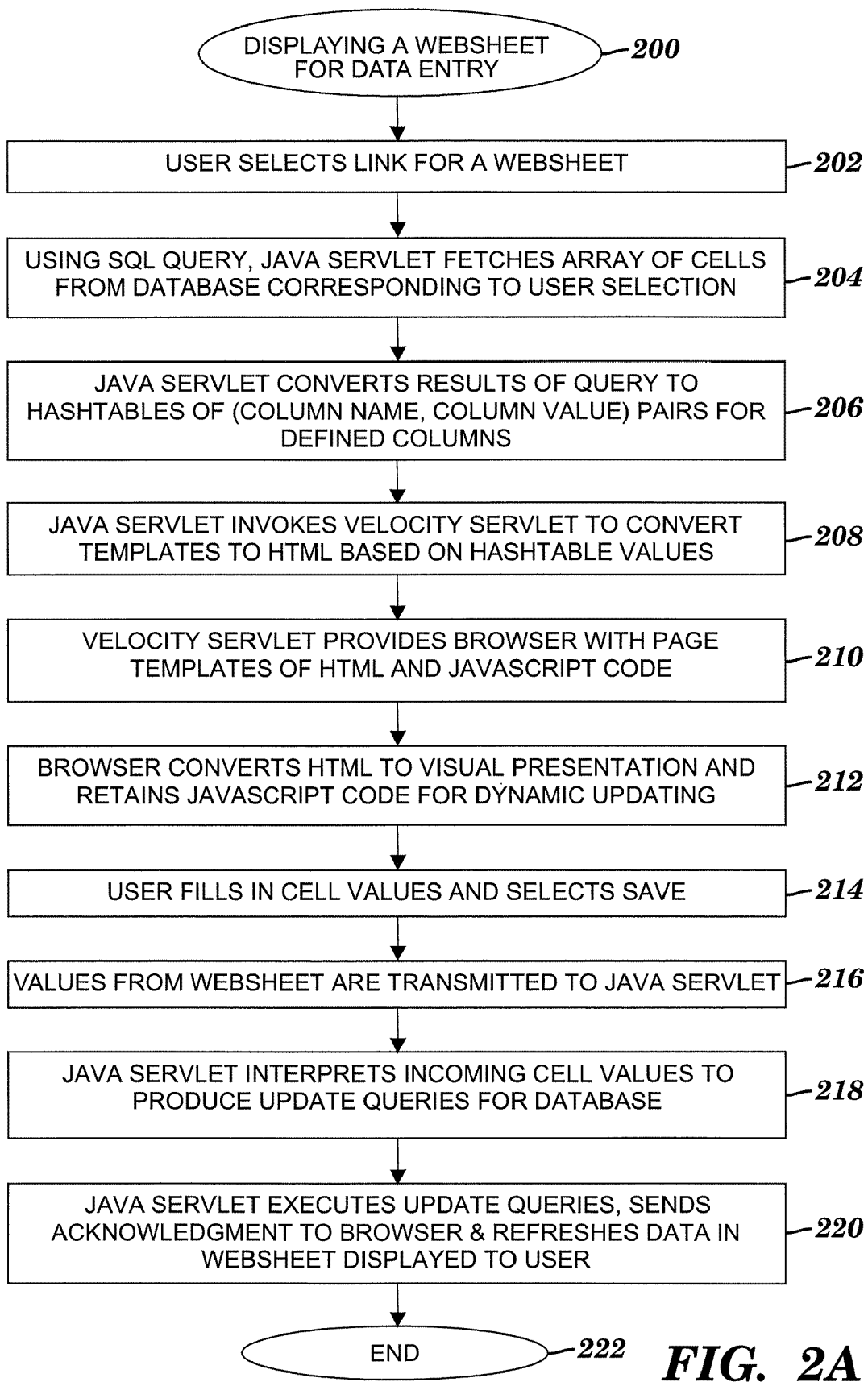
FIG. 2A is a flow chart of a process for displaying a websheet for data entry that can be implemented in the system of FIG. 1, in accordance with embodiments of the present invention.

FIG. 2A is a flow chart of a process for displaying a websheet for data entry that can be implemented in the system of FIG. 1, in accordance with embodiments of the present invention. The websheet display process begins at step 200. In step 202, a user selects a websheet to display and work with (e.g., enter data into cells of the websheet). The user selects the websheet by, for example, selecting a link displayed on web browser 108 (see FIG. 1). In step 204, Java® servlet 124 (see FIG. 1) residing on server computing unit 106 (see FIG. 1) extracts, from database 122 (see FIG. 1), data values associated with an array of cells of the websheet selected in step 202. The extraction of the data values associated with the cells uses a query (e.g., an SQL query) via an interface (e.g., a JDBC® interface) from code in servlet 124 (see FIG. 1). A JDBC® interface is an application programming interface for a Java® program that defines how a client computing unit may access a database. In step 206, servlet 124 (see FIG. 1) converts the results of the query of step 204 to hashtables of (column-name, column-value) pairs, where each pair identifies an entry of a table of a plurality of relational database tables of database 122 (see FIG. 1). The columns of each relational database table are defined by one of the tables of FIGS. 2B-2D.

FIG. 2B is a table 230 defining attributes of the websheet displayed by the process of FIG. 2A, in accordance with embodiments of the present invention. The attributes defined in table 230 are associated with the contents or appearance of a cell of a websheet, and facilitate the generation of database commands (e.g., DB2® definition commands). Each column name in table 230 identifies a column of one of the relational database tables of relational database 122 (see FIG. 1) that organizes data values related to the websheet according to a spreadsheet model. Data values in database 122 (see FIG. 1) include both (1) data values comprising the contents of cells of a websheet, where the content is a value displayed to a user during the process of FIG. 2A (a.k.a. a cell data value), and (2) data values associated with the configuration of the websheet (a.k.a. a configuration-related data value), which includes the configuration of a cell of the websheet. If one or more cell data values are calculated (e.g., calculated from other cell data values), then the data values of database 122 (see FIG. 1) also include a set of one or more expressions (i.e., formulas), each of which is used to calculate a cell data value of the websheet.

A cell data value is a number, a string, or an expression to be used to calculate a value to be displayed. Cell data values are displayed on the websheet at client computing unit 104 (see FIG. 1) in response to the client computing unit receiving a web page that includes the websheet.

Configuration-related data values are data tags that determine the websheet's display appearance or layout (e.g., number of rows or number of columns in the websheet), the data type that is permitted to be displayed within a cell (e.g., integer, string, etc.), the display type associated with data displayed within a cell (e.g., choices from a drop-down list), an expression to be calculated to determine a cell data value, an indicator indicating whether a cell data value is modifiable, the highlighting of a cell, and any other appearance-related aspect of a cell. At least one of the configuration-related data values is associated with each cell of the websheet. Configuration-related data values are not displayed on the websheet at client computing unit 104 (see FIG. 1) in response to the client computing unit receiving a web page that includes the websheet whose configuration is to be updated by the process of FIG. 2A.

The column names of table 230 indicate the following data values related to a cell of a websheet:

ROWINDEX and COLUMNINDEX: the integer row and column numbers, respectively, of the cell. The row and column numbers indicate the position of the cell in a grid that displays a sheet of the websheet. ROWINDEX and COLUMNINDEX are keys of relational database 122 (see FIG. 1).

SHEETID: an integer identifier of a sheet that includes the cell. SHEETID is a relational database key that indicates a particular sheet of one or more sheets within a page.

BUSINESSUNITID: an optional relational database key that identifies a particular business unit associated with the cell.

LABEL: a string used to identify the cell. LABEL is used by other cells of the websheet to refer to the cell. For example, a formula used to calculate a data value of the websheet can include LABEL strings.

INT_VALUE, STR_VALUE, DATE_VALUE, FLOAT_VALUE: Each of these column names indicates a data value of a particular type that can be displayed in the cell of the websheet (i.e., integer, string, date, and floating point, respectively).

SCRIPT_VALUE: If the cell displays a calculated data value, SCRIPT_VALUE includes the formula for the calculation. If the formula refers to the values displayed in other cells, then the formula includes values associated with the LABEL column. SCRIPT_VALUE can also include an expression used to validate data (e.g., a predefined range determining a valid data value).

DATATYPE: indicates the type of the data value displayed in the cell. For example, I indicates an integer value, S indicates a string value, D indicates a date value, etc.

DISPLAY_TYPE: indicates how a data value or possible data values are displayed in the cell. For instance, DISPLAY_TYPE values can indicate predefined drop down lists, such as selections for YES/NO, or a list of colors available for displaying the background of the cell or the value displayed in the cell. An entry of G indicates a general display type, which displays a number as a string of digits, as opposed to a drop down list.

MODIFIABLE: indicates whether or not the user can modify the value displayed in the cell (e.g., Y indicating modifiable and N indicating not modifiable).

FIG. 2C is a table 260 defining a sheet associated with the attributes defined in FIG. 2B, in accordance with embodiments of the present invention. The sheet defined in table 260 is a sheet of one or more sheets included in the websheet whose attributes are defined by FIG. 2B. The column names of table 260 indicate the following data values related to a sheet of a websheet:

SHEETID: an integer identifier of a sheet that includes the cell. SHEETID is a key of relational database 122 (see FIG. 1) that indicates a particular sheet of one or more sheets within a page.

SHEETLABEL: a string used to identify the sheet. For example, a formula used for a calculation of a data value of the websheet can utilize SHEETLABEL to indicate which sheet includes a value that is included in the formula.

PAGEID: an integer identifier of a page that includes the sheet.

NUMROWS: the total number of rows of the sheet identified by SHEETID.

NUMCOLUMNS: the total number of columns of the sheet identified by SHEETID.

FIG. 2D is a table 270 defining a page associated with the sheet defined in FIG. 2C, in accordance with embodiments of the present invention. The page defined in table 270 is a page including one or more sheets of a websheet. The column names of table 270 indicate the following data values related to a page:

PAGEID: an integer identifier of a page. PAGEID is used a key in relational database 122 (see FIG. 1).

PAGELABEL: a string used to identify the page.

In one embodiment, a single, general-purpose relational database table is used to store all the data values defined by FIGS. 2B-2D.

Returning to FIG. 2A, following the creation of column-name, column-value hashtables in step 206, Java® servlet 124 (see FIG. 1) invokes, in step 208, a servlet provided by Velocity engine 126. The Velocity servlet utilizes Velocity macros to convert templates to HTML, based in part on values retrieved from the hashtables of step 206. In step 210, the Velocity servlet transmits the page templates of HTML and JavaScript® code to the user's web browser 108 (see FIG. 1). In step 212, web browser 108 (see FIG. 1) converts the HTML code to the visual presentation of the websheet, and retains the JavaScript® code to use for dynamic updating of calculated data values as the user accesses and interacts with the websheet via web browser 108 (see FIG. 1). Step 212 also displays the websheet to the user at client computing unit 104 (see FIG. 1). An example of a websheet displayed to the user in step 212 is shown in screen 280 of FIG. 2E.

In step 214, the user enters one or more data values in the websheet. Each data value entered is input into one cell of the websheet. When the user is done entering data in the websheet, the user indicates the completion of data entry by, for example, clicking a Save All Changes button (see FIG. 2E) with a pointing device. In step 216, data values displayed in the websheet are transmitted to Java® servlet 124 (see FIG. 1), cell by cell, using a Common Gateway Interface (CGI) parameter mechanism. CGI specifies a standard for passing data between a client and a web server. Data values associated with certain columns of the relational database table (e.g., columns in FIG. 2B with "VALUE" extensions, such as INT_VALUE, STR_VALUE, etc.) are the only values affected by step 216. In step 218, Java® servlet 124 (see FIG. 1) interprets incoming cell data values to produce update queries for database 122 (see FIG. 1). The update queries are, for instance, SQL queries that utilize a JDBC® interface. In step 220, Java® servlet 124 (see FIG. 1) executes the update queries produced in step 218, sends an acknowledgement of completion (or an error message) to the user's web browser 108 (see FIG. 1), and refreshes the cell data values in the websheet as displayed to the user at client computing unit 104.

Figure 3A:
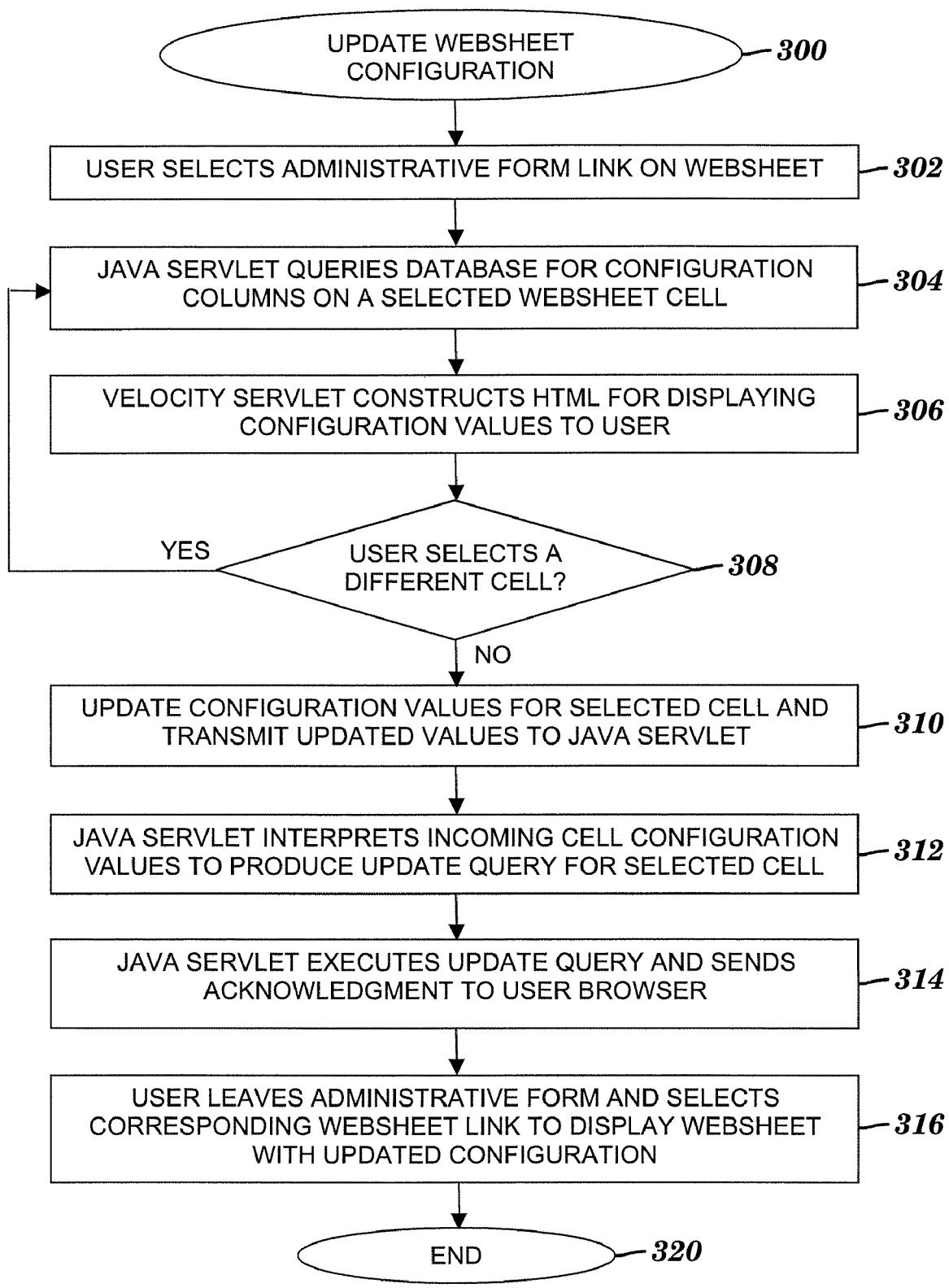
FIG. 3A is a flow chart of a process for updating a configuration of the websheet displayed by the process of FIG. 2A, in accordance with embodiments of the present invention.

As a user utilizes the process of FIG. 2A to access a websheet for data entry, the present invention provides the user with the capability to dynamically update the configuration of the websheet being accessed. FIG. 3A is a flow chart of a process for updating a configuration of the websheet (e.g., screen 280 of FIG. 2E) displayed by the process of FIG. 2A, in accordance with embodiments of the present invention. The websheet configuration update process begins at step 300. In step 302, the user selects a link (not shown on FIG. 2E) on the websheet to perform an administrative action, such as updating the configuration of the websheet. The user selection is performed at client computing unit 104 (see FIG. 1)

after the client receives a web page, which includes the websheet, from server computing unit 106 (see FIG. 1). The user selection is transmitted from the client to Java® servlet 124 (see FIG. 1).

In step 304, Java® servlet 124 (see FIG. 1) queries database 122 (see FIG. 1) for retrieval of configuration-related data values associated with a layout of a group of cells of the websheet and/or configuration-related data values associated with a particular cell of the websheet. For example, an SQL query retrieves a data value (e.g., NUMROWS of FIG. 2C) providing the total number of rows of a sheet. As another example, an SQL query retrieves a data value (e.g., DISPLAYTYPE of FIG. 2B) associated with the display type of a cell of the websheet. The configuration-related data values of FIGS. 2B-2D retrieved by the query of step 304 are the values that are capable of being updated in the process of FIG. 3A. It will be apparent to those skilled in the art that the tables of FIGS. 2B-2D may be extended to include other configuration-data values not shown, such as data values defining the widths of each of the columns of the websheet, or the highlighting utilized in a cell of the websheet.

In step 306, macros provided by Velocity engine 126 (see FIG. 1) construct HTML code to display the configuration-related data values to the user at client computing unit 104 (see FIG. 1). The configuration-related data values are displayed in a data value input form, which has entry fields for the configuration-related data values. In one embodiment, some aspects of the configuration of the websheet (e.g., column widths) are determined by code provided by Velocity engine 126 (see FIG. 1), rather than by data values of the relational database tables defined by FIGS. 2B-2D.

The data value input form is received at client computing unit 104 (see FIG. 1) for display to a user via web browser 108 (see FIG. 1). The data value input form can also include entry fields for cell data values. FIG. 3B depicts a screen 330 including a data value input form displaying updateable configuration-related data values (e.g., Display Type and Data Type) and cell data values (e.g., Full Row of Values) of the websheet of FIG. 2E, in accordance with embodiments of the present invention. In one embodiment, the data value input form includes data entry fields that update the number of rows and the number of columns of the websheet.

Figure 3C:
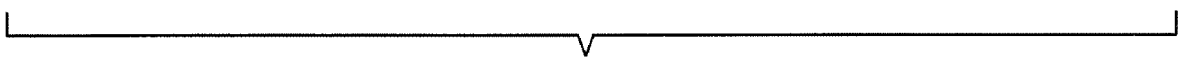
FIG. 3C is a screen including a data value input form including data in an entry field for updating the configuration of the websheet of FIG. 2E, in accordance with embodiments of the present invention.

Returning to FIG. 3A, inquiry step 308 determines if the user selects another cell to display different data on the data value input form. If the user selects another cell, the process repeats starting at step 304. If the user does not select another cell, the process continues with step 310. In step 310, the user modifies the configuration-related data values on the data value input form of step 306. For example, screen 350 of FIG. 3C illustrates a data value input form that includes data in an entry field for updating the configuration (e.g., the number of rows) of the websheet of FIG. 2E. The configuration of the 6-row websheet of FIG. 2E is updated by entering 7 in the entry field labeled "Row" in the data entry form of FIG. 3C. Cell data values are added to the newly added row 7 in entry fields (e.g., under "Full Row of Values"). For instance, screen 350 illustrates the added cell data values of "Test" at row 7, column 1 and 7777 at row 7, column 2. The updated configuration-related data values are transmitted to Java® servlet 124 (see FIG. 1) in step 310 via a CGI parameter mechanism.

In an alternate embodiment, configuration-related data values associated with a sheet (e.g., number of rows and number of columns) rather than with only a single cell are presented to the user on a form separate from the form shown in FIG. 3C in response to a user's selection on websheet 280 (see FIG. 2E) and/or data entry form 330 (see FIG. 3B).

In step 312, Java® servlet 124 (see FIG. 1) interprets incoming configuration-related data values to produce an update query for the selected cell. In step 314, Java® servlet 124 (see FIG. 1) executes the update query produced in step 312, and sends an acknowledgment of completion of the execution (or an error message) to the user's web browser 108 (see FIG. 1). In response to completing the execution of the update query produced in step 312, the data values modified in step 310 are updated in database 122 (see FIG. 1).

In step 316, the user exits the data value input form and selects a link to the websheet that corresponds to the exited data value input form. Step 316 displays the websheet at client computing unit 104 (see FIG. 1) via web browser 108 (see FIG. 1), with the displayed websheet's configuration updated as determined by the updated configuration-related data values of step 310. The websheet of step 316 displays cell data values included in the cells of the websheet. A data entry in a cell of the websheet follows the process of FIG. 2A and is capable of adding a new cell data value or updating an existing cell data value. For example, screen 370 of FIG. 3D depicts the websheet of FIG. 2E after its configuration is changed by the input in FIG. 3C of the configuration-related data value that adds a seventh row to the websheet. The process of updating a websheet configuration ends at step 320.

In one embodiment, access to the process of FIG. 3A is limited to a privileged user who has been authorized to update the configuration of the websheet.

In another embodiment, the process of FIG. 3A includes dynamically updating an expression (i.e., a formula) to be calculated for display in a cell of the websheet. The expression to be calculated is included in the data value input form (e.g., adjacent to "Formula"). After updating the formula in step 310, an associated data value in relational database 122 (see FIG. 1) is updated (e.g., a value of the SCRIPT_VALUE column of FIG. 2B). One or more functions provided by a scripting programming language (e.g., JavaScript® functions) are executed to interpret the updated formula, perform the calculation indicated by the formula, and provide a result. In response to the calculation, the result is assigned to the associated cell data value.

Code Examples

The following HTML and Velocity code implements logic for rendering a websheet in, for instance, step 212 of FIG. 2A or step 316 of FIG. 3D. The code and its internal comments use "spreadsheet" as a synonym for a websheet, as described herein. The code below utilizes a "foreach" primitive to count the number of rows and columns, rather than having the row and column totals stored in database 122 (see FIG. 1). A preferred embodiment uses a different approach, however, and stores the number of rows and the number of columns in database 122 (see FIG. 1), which allows the user of client computing unit 104 (see FIG. 1) to update the number of rows and/or the number of columns on the data value input form shown in FIG. 3C.

```
<!-- start of spreadsheet definition -->
<table class="ss_table" summary="CIO Dashboard" cellspacing="2">
<tbody>

#foreach($row in $spreadsheet)
#set($rowCount = $velocityCount)
#set($rowID = $row.key)
<!-- spreadsheet row ${rowCount} -->
<tr class="ss_row">
```

```

#foreach ($cell in $row.value)
#set ($colCount = $velocityCount)
#set ($colCount0 = $velocityCount - 1)
#set ($key = $cell.key)
#set ($val = $cell.value)

note: $val ($cell.value) is a hashtable keyed on column names
from query: cell_data, modifiable, displaytype

Data type: i(nteger), s(tring), d(ate), f(loat), c(urrency)', j(ava script
formula);
Display type: P=Percent, U=cUrrency, H=Header, G=general,
C=content only, Y=yes/no radio, T=true/false, S=sat/unsat,
Z=Fall 2003, X=X or blank, R=Red/Green/Yellow

#if ($val.displaytype == 'H')
display type is Header
#if ($rowCount == 1)
<th id="hdr-col-${colCount}" class="col_header"
style="width:$columnWidth.get($colCount0)px">$val.cell_data</th>
#else
<td id="hdr-row-${rowID}" class="row_header" >$val.cell_data</td>
#end

if display type is General or cUrrency or Percent
#elseif ($val.displaytype == 'G' || $val.displaytype == 'U' ||
$val.displaytype == 'P')
<td headers="hdr-col-${colCount}" style="width:
$columnWidth.get($colCount0)px">
#if ($val.modifiable == 'Y' && $val.lockmode == '0')
<label for="${val.label}"/>
<input name="${val.label}" id="${val.label}" style="width:
$columnWidth.get($colCount0)px" onKeyPress="return autoTab(this,
event);" onChange="if(!${sheetName}Validator.check(this)) return
false;${sheetName}.evalCell(this);" class="ss_input" type="text"
maxLength="$maxLength.get($colCount0)" value="" />
#elseif ($val.modifiable == 'Y' && $val.lockmode == '1')
<input name="${val.label}" id="${val.label}" style="width:
$columnWidth.get($colCount0)px" readonly="true" onKeyPress="return
autoTab(this, event);" class="ss_input_lok" type="text" value="" />
#else
<input name="${val.label}" id="${val.label}" style="width:
$columnWidth.get($colCount0)px" readonly="true" onKeyPress="return
autoTab(this, event);" class="ss_input_ro" type="text" value="" />
#end
</td>

if display type is X or Blank
#elseif ($val.displaytype == 'X')
#if ($val.modifiable == 'Y')
<td headers="hdr-col-${colCount}" style="width:
$columnWidth.get($colCount0)px">
<label for="${val.label}"/>
<input name="${val.label}" id="${val.label}" style="text-align:
center;width:
$columnWidth.get($colCount0)px" onKeyPress="return autoTab(this,
event);" onChange="${sheetName}.evalCell(this);return
${sheetName}Validator.check(this);" class="ss_input" type="text"
maxLength="$maxLength.get($colCount0)" value="" />
</td>
#else
<td headers="hdr-col-$velocityCount">
<input name="${val.label}" id="${val.label}" style="text-align:
center;width:
$columnWidth.get($colCount0)px" readonly="true" onKeyPress="return
autoTab(this, event);" class="ss_input_ro" type="text" value="" />
</td>
#end

if display type is Content ( text )
#elseif ($val.displaytype == 'C')
##<td style="text-align: center; width:
$columnWidth.get($colCount0)px">$val.cell_data</td>
<td style="text-align: center; width:
$columnWidth.get($colCount0)px">$val.cell_data</td>

if display type is sat/unsat
#elseif ($val.displaytype == 'S')
```

```
<td>
<select name="${val.label}" id="${val.label}" style="width:
$columnWidth.get($colCount0)px">
<option value="" #if(${val.cell_data}=="")selected="true"#end>[Select
rating]</option>
<option value="Sat"
#if(${val.cell_data}=="Sat")selected="true"#end>Sat</option>
<option value="Mar"
#if(${val.cell_data}=="Mar")selected="true"#end>Mar</option>
<option value="Unsat"
#if(${val.cell_data}=="Unsat")selected="true"#end>Unsat</Option>
<option value="Various"
#if(${val.cell_data}=="Various")selected="true"#end>Various</option>
<option value="TBD"
#if(${val.cell_data}=="TBD")selected="true"#end>TBD</option>
</select>
</td>

if displaytype is Red/Green/Yellow ( status )
#elseif ($val.displaytype == 'R')
<td>
<select name="${val.label}" id="${val.label}" style="width:
$columnWidth.get($colCount0)px">
<option value=""
#if(${val.cell_data}=="")selected="true"#end>---</option>
<option value="Red"
#if(${val.cell_data}=="Red")selected="true"#end>Red</option>
<option value="Green"
#if(${val.cell_data}=="Green")selected="true"#end>Grn</option>
<option value="Yellow"
#if(${val.cell_data}=="Yellow")selected="true"#end>Yel</option>
<option value="Inactive"
#if(${val.cell_data}=="Inactive")selected="true"#end>N/A</option>
</select>
</td>
#else
<td style="width: $columnWidth.get($colCount0)px">$val.cell_data</td>
#end
#end
end foreach cell in row
</tr>
#end
end foreach row in sheet
</tbody>
</table>

```

The following JavaScript® code implements a portion of the logic for performing calculations in a websheet. The calculations can facilitate the dynamic updating of data values in, for example, step 212 of FIG. 2A.

```
this.evalCell = function(html_ss_cell)
{
// check if a formula was entered into the table cell
if (html_ss_cell.value.length > 0 &&
html_ss_cell.value.charAt(0) == '=')
{
this.setCellForumla(html_ss_cell.id, html_ss_cell.value.substring(1));
// clear out the cell value and html table field
this.setCellValue(html_ss_cell.id, '');
}
else
{
this.setCellValue(html_ss_cell.id, html_ss_cell.value);
}
this.recalc( );
if (this.linkedSheet != null) this.linkedSheet.recalc( );
}
this.recalc = function( )
{
// resolve formula cell references
// and substitute with the referenced cell.value
```

-continued

```
var cell = null;
for (ref in this.cellMap)
{
cell = this.cellMap[ref];
if (cell.formula != null)
{
try
{
this.resolveCellRefs(cell.id);
}
catch (exception)
{
alert("Error in formula: " + id + "\n" + cell.formula);
}
}
}
// Evaluate cell values as formulas
// cell.value contains the formulas with
// cell labels (references) substituted with the referenced cell.value
var evalResult = "";
for (ref in this.cellMap)
{
cell = this.cellMap[ref];
// eval only formulas that are marked as valid
if (cell.formula != null)
{
if (cell.status == true)
{
try
{
evalResult = eval(cell.value);
}
catch (ex)
{
evalResult="";
}
this.setCellValue(cell.id, evalResult);
}
else
{
this.setCellValue(cell.id, "");
}
}
}
}
```

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can tale the form of a computer program product accessible from a computer-usable or computer-readable medium providing program code 108, 110, 124, 126 (see FIG. 1) for use by or in connection with a computer 104, 106 (see FIG. 1) or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 114 (see FIG. 1), ROM, a rigid magnetic disk and an optical disk. Current examples of optical disks include compact disk-read-only memory (CD-ROM), compact disk-read/write (CD-R/W) and DVD.

A data processing system 100 (see FIG. 1) suitable for storing and/or executing program code 108, 110, 124, 126 (see FIG. 1) will include at least one processor 112 (see FIG. 1) coupled directly or indirectly to memory elements 114 (see FIG. 1) through a system bus 118 (see FIG. 1). The memory elements can include local memory employed during actual execution of the program code, bulk storage, and cache memories which provide temporary storage of at least some program code in order to reduce the number of times code must be retrieved from bulk storage during execution.

Furthermore, the present invention discloses a method for deploying or integrating computing infrastructure, comprising integrating computer-readable code into computer system 100 (see FIG. 1), wherein the code in combination with computer system 100 (see FIG. 1) is capable of performing a process of updating a configuration of a websheet. The disclosed method for deploying or integrating computing infrastructure with the capabilities described herein can be offered as a service on a subscription service.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer system comprising a processor and a computer-readable memory unit coupled to said processor, said memory unit containing instructions that when executed by said processor implement a method of updating a configuration of a websheet in a network computing environment, said method comprising:

receiving, at said computer system via a browser running on said computer system, a web page having said websheet from a server computing unit, said websheet comprising a plurality of cells associated with a plurality of data values, wherein said plurality of data values is stored in a table of a relational database stored in a storage unit coupled to said server computing unit and comprises:

a first set of data values displayed on said websheet at said computer system in response to said computer system receiving said web page, and a second set of data values that specifies said configuration of said websheet, said second set not being displayed on said websheet at said computer system in response to said computer system receiving said web page, wherein a cell of said plurality of cells includes a data value of said first set, wherein said configuration of said websheet includes a configuration of said cell, and wherein said configuration of said cell is specified by multiple data values of said second set;

activating, subsequent to said receiving said web page having said websheet, a link to a data value input form, wherein said link is on said websheet, and wherein said data value input form is not said websheet and is not any other websheet;

exiting said websheet via said browser in response to said activating said link to said data value input form;

displaying said data value input form at said computer system via said browser and in response to said activating said link to said data value input form, wherein said displaying said data value input form includes:
  querying said relational database a first time, wherein said querying said first time includes retrieving said multiple data values of said second set from a plurality of fields included in said table of said relational database; and
  displaying, at said computer system and in response to said querying, said multiple data values of said second set in a plurality of entry fields of said data value input form, wherein a data value of said multiple data values of said second set indicates a first data type that categorizes said data value of said first set and is included in an entry field of said plurality of entry fields;
replacing, in said entry field of said data value input form and subsequent to said displaying said data value input form, said data value of said second set with a replacement data value that indicates a second data type that categorizes an update of said data value of said first set, wherein said second data type is different from said first data type;
updating, in a field of said plurality of fields included in said table of said relational database and in response to said replacing, said data value of said second set with said replacement data value that indicates said second data type, wherein a result of said updating said data value of said second set is an association in said table of said relational database between said cell and said replacement data value; and
displaying, subsequent to said updating said data value of said second set, said websheet at said computer system via said browser and in an update of said configuration of said websheet, wherein said displaying said websheet includes:
  querying said relational database a second time, wherein said querying said second time includes retrieving said replacement data value that indicates said second data type from said field of said plurality of fields included in said table of said relational database; and
  displaying, in response to said querying said second time, said first set with said data value of said first set replaced by said update of said data value of said first set, wherein said displaying said first set includes displaying said update of said data value of said first set as a data value of a data type indicated by said replacement data value, and wherein said data type indicated by said replacement data value is said second data type.

2. The system of claim 1, wherein said plurality of data values further comprises:
  a third set of one or more data values providing one or more calculations in a one-to-one correspondence, said third set including a data value to be calculated to provide a calculation of said one or more calculations, said calculation determining said data value of said first set.

3. The system of claim 2, wherein said method further comprises executing one or more functions provided by a scripting programming language and residing at said computer system, said executing comprising interpreting said data value included in said third set, said interpreting performing said calculation to determine said data value of said first set.

4. The system of claim 1, wherein said method further comprises:
  extracting data values from said plurality of data values stored in said table;
  assembling said extracted data values into one or more data structures; and
  rendering said data value input form and said websheet for display at said computer system, said rendering based on said one or more data structures.

5. The system of claim 1, wherein said method further comprises:
  selecting, subsequent to said receiving said web page having said websheet, a second link to said data value input form, wherein said second link is on said websheet;
  displaying, in a display type entry field of said plurality of entry fields of said data value input form, a type of a display of a second cell in said websheet, wherein said second cell includes a second data value of said first set; wherein said displaying said type of said display is performed in response to said selecting said second link, wherein said type of said display is a first list of values, wherein each value of said first list of values is permitted to be in said second cell based on a predefined criterion, and wherein said first list of values includes said second data value of said first set;
  replacing, in said display type entry field and subsequent to said displaying said type of said display, said first list of values with a second list of values that is different from said first list of values; and
  displaying, subsequent to said replacing said first list of values, said websheet at said computer system via said browser and in a second update of said configuration of said websheet, wherein said displaying said websheet in said second update of said configuration of said websheet includes displaying said second list of values as potential selections for an entry in said second cell.

6. The system of claim 5, wherein said method further comprises:
  sending, subsequent to said replacing said first list of values and prior to said displaying said websheet in said second update of said configuration of said websheet, said second list of values to a servlet running on said server computing unit;
  receiving, by said browser running on said computer system and subsequent to said sending said second list of values to said servlet, an acknowledgment from said servlet, wherein said acknowledgment indicates an execution of a query by said servlet to update said table of said relational database with an association between said second cell and said second list of values;
  exiting said data value input form subsequent to said receiving said acknowledgment; and
  selecting a websheet link subsequent to said receiving said acknowledgment, wherein said displaying said websheet in said second update of said configuration of said websheet is performed in response to said selecting said websheet link.

7. The system of claim 1, wherein said method further comprises:
  selecting, subsequent to said receiving said web page having said websheet, a second link to said data value input form, wherein said second link is on said websheet;
  displaying, in a display type entry field of said plurality of entry fields of said data value input form, a type of a display of a second cell in said websheet, wherein said second cell includes a second data value of said first set, wherein said displaying said type of said display is performed in response to said selecting said second link, wherein said type of said display is a first list of colors, and wherein each color of said first list of colors is permitted to be a color of a background of said second cell based on a predefined criterion;

replacing, in said display type entry field and subsequent to said displaying said type of said display, said first list of colors with a second list of colors that is different from said first list of colors; and displaying, subsequent to said replacing said first list of colors, said websheet at said computer system via said browser and in a second update of said configuration of said websheet, wherein said displaying said websheet in said second update of said configuration of said websheet includes displaying said second list of colors as potential selections for said color of said background of said second cell.

8. The system of claim 7, wherein said method further comprises:

sending, subsequent to said replacing said first list of colors and prior to said displaying said websheet in said second update of said configuration of said websheet, said second list of colors to a servlet running on said server computing unit;

receiving, by said browser running on said computer system and subsequent to said sending said second list of colors to said servlet, an acknowledgment from said servlet, wherein said acknowledgment indicates an execution of a query by said servlet to update said table of said relational database with an association between said second cell and said second list of colors;

exiting said data value input form subsequent to said receiving said acknowledgment; and selecting a websheet link subsequent to said receiving said acknowledgment, wherein said displaying said websheet in said second update of said configuration of said websheet is performed in response to said selecting said websheet link.

9. The system of claim 1, wherein said method further comprises:

selecting, subsequent to said receiving said web page having said websheet, a second link to said data value input form, wherein said second link is on said websheet;

displaying, in a display type entry field of said plurality of entry fields of said data value input form, a type of a display of a second cell in said websheet, wherein said second cell includes a second data value of said first set, wherein said displaying said type of said display is performed in response to said selecting said second link, wherein said type of said display is a first list of colors, and wherein each color of said first list of colors is permitted to be a color of said second data value of said first set based on a predefined criterion;

replacing, in said display type entry field and subsequent to said displaying said type of said display, said first list of colors with a second list of colors that is different from said first list of colors; and displaying, subsequent to said replacing said first list of colors, said websheet at said computer system via said browser and in a second update of said configuration of said websheet, wherein said displaying said websheet in said second update of said configuration of said websheet includes displaying said second list of colors as potential selections for said color of said second data value of said first set.

10. The system of claim 9, wherein said method further comprises:

sending, subsequent to said replacing said first list of colors and prior to said displaying said websheet in said second update of said configuration of said websheet, said second list of colors to a servlet running on said server computing unit;

receiving, by said browser running on said computer system and subsequent to said sending said second list of colors to said servlet, an acknowledgment from said servlet, wherein said acknowledgment indicates an execution of a query by said servlet to update said table of said relational database with an association between said second cell and said second list of colors;

exiting said data value input form subsequent to said receiving said acknowledgment; and selecting a websheet link subsequent to said receiving said acknowledgment, wherein said displaying said websheet in said second update of said configuration of said websheet is performed in response to said selecting said websheet link.

11. The system of claim 1, wherein said method further comprises:

selecting, subsequent to said receiving said web page having said websheet, a second link to said data value input form, wherein said second link is on said websheet, wherein said second link is associated with a layout of said websheet, wherein said configuration of said websheet includes said layout, and wherein said layout includes an initial total number of rows of said websheet;

displaying, in a row entry field of said plurality of entry fields of said data value input form, a first index number of a row of said websheet, wherein said displaying said first index number of said row is performed in response to said selecting said second link;

replacing, in said row entry field and subsequent to said displaying said first index number, said first index number with a second index number that exceeds said initial total number of rows; and displaying, subsequent to said replacing said first index number, said websheet at said computer system via said browser and in an update of said layout, wherein said displaying said websheet in said update of said layout includes displaying said websheet with an updated total number of rows that is equal to said second index number.

12. The system of claim 11, wherein said method further comprises:

sending, subsequent to said replacing said first index number and prior to said displaying said websheet in said update of said layout, said second index number to a servlet running on said server computing unit;

receiving, by said browser running on said computer system and subsequent to said sending said second index number to said servlet, an acknowledgment from said servlet, wherein said acknowledgment indicates a determination by said servlet that said second index number exceeds said initial total number of rows, and wherein said acknowledgment further indicates an execution of a query by said servlet to update said table of said relational database with an association between said second index number and a total number of rows of said websheet;

exiting said data value input form subsequent to said receiving said acknowledgment; and selecting a websheet link subsequent to said receiving said acknowledgment, wherein said displaying said websheet in said update of said layout is performed in response to said selecting said websheet link.

13. The system of claim 1, wherein said method further comprises:

selecting, subsequent to said receiving said web page having said websheet, a second link to said data value input form, wherein said second link is on said websheet, wherein said second link is associated with a layout of said websheet, wherein said configuration of said websheet includes said layout, and wherein said layout includes an initial total number of columns of said websheet;

displaying, in a column entry field of said plurality of entry fields of said data value input form, a first index number of a column of said websheet, wherein said displaying said first index number of said column is performed in response to said selecting said second link;

replacing, in said column entry field and subsequent to said displaying said first index number, said first index number with a second index number that exceeds said initial total number of columns; and displaying, subsequent to said replacing said first index number, said websheet at said computer system via said browser and in an update of said layout, wherein said displaying said websheet in said update of said layout includes displaying said websheet with an updated total number of columns that is equal to said second index number.

14. The system of claim 13, wherein said method further comprises:

sending, subsequent to said replacing said first index number and prior to said displaying said websheet in said update of said layout, said second index number to a servlet running on said server computing unit;

receiving, by said browser running on said computer system and subsequent to said sending said second index number to said servlet, an acknowledgment from said servlet, wherein said acknowledgment indicates a determination by said servlet that said second index number exceeds said initial total number of columns, and wherein said acknowledgment further indicates an execution of a query by said servlet to update said table of said relational database with an association between said second index number and a total number of columns of said websheet;

exiting said data value input form subsequent to said receiving said acknowledgment; and selecting a websheet link subsequent to said receiving said acknowledgment, wherein said displaying said websheet in said update of said layout is performed in response to said selecting said websheet link.

15. The system of claim 1, wherein said method further comprises displaying, subsequent to said displaying said data value input form, said multiple data values of said second set in respective entry fields of said plurality of entry fields of said data value input form, wherein said displaying said multiple data values includes:

displaying, in a display type entry field of said plurality of entry fields of said data value input form, a type of a display of said second cell in said websheet, wherein said displaying said type of said display is performed in response to said selecting said link, wherein said type of said display is a predefined list selected from the group consisting of a list of values, a first list of colors and a second list of colors, wherein each value of said list of values is permitted to be in said cell, wherein each color of said first list of colors is permitted to be a color of a background of said cell, and wherein each color of said second list of colors is permitted to be a color of said data value of said first set;

displaying, in a row entry field of said plurality of entry fields of said data value input form, a first index number of a row of said websheet, wherein said displaying said first index number of said row is performed in response to said selecting said link, and wherein said row includes said data value of said first set; and displaying, in a column entry field of said plurality of entry fields of said data value input form, a first index number of a column of said websheet, wherein said displaying said first index number of said column is performed in response to said selecting said link, and wherein said column includes said data value of said first set, and wherein said method further comprises updating, subsequent to said displaying said multiple data values, a value in a second entry field of said plurality of entry fields, wherein said second entry field is selected from the group consisting of said display type entry field, said row entry field and said column entry field.

16. The system of claim 1, wherein said method further comprises:

sending, subsequent to said replacing said data value of said second set and prior to said displaying said websheet in said update of said configuration of said websheet, said replacement data value that indicates said second data type to a servlet running on said server computing unit;

receiving, by said browser running on said computer system and subsequent to said sending said replacement data value, an acknowledgment from said servlet, wherein said acknowledgment indicates an execution of a query by said servlet to update said table of said relational database with an association between said replacement data value and said cell;

exiting said data value input form subsequent to said receiving said acknowledgment; and selecting a websheet link subsequent to said receiving said acknowledgment, wherein said displaying said websheet in said update of said configuration of said websheet is performed in response to said selecting said websheet link.

17. The system of claim 1, wherein said replacing said data value of said second set with said replacement data value includes selecting said replacement data value from a predefined set of values, wherein said predefined set of values includes a value that indicates an integer data type, a value that indicates a string data type, and a value that indicates a floating point data type.

18. A computer program product, comprising a computer-readable storage medium having a computer-readable program code stored therein, said computer-readable program code containing instructions configured to be executed by a processor of a computer system to implement a method of updating a configuration of a websheet in a network computing environment, said method comprising:

receiving, at said computer system via a browser running on said computer system, a web page having said websheet from a server computing unit, said websheet comprising a plurality of cells associated with a plurality of data values, wherein said plurality of data values is stored in a table of a relational database stored in a storage unit coupled to said server computing unit and comprises:

a first set of data values displayed on said websheet at said computer system in response to said computer system receiving said web page, and a second set of data values that specifies said configuration of said websheet, said second set not being displayed on said websheet at said computer system in response to said computer system receiving said web page, wherein a cell of said plurality of cells includes a data value of said first set, wherein said configuration of said websheet includes a configuration of said cell, and wherein said configuration of said cell is specified by multiple data values of said second set;

activating, subsequent to said receiving said web page having said websheet, a link to a data value input form, wherein said link is on said websheet, and wherein said data value input form is not said websheet and is not any other websheet;

exiting said websheet via said browser in response to said activating said link to said data value input form;

displaying said data value input form at said computer system via said browser and in response to said activating said link to said data value input form, wherein said displaying said data value input form includes:

querying said relational database a first time, wherein said querying said first time includes retrieving said multiple data values of said second set from a plurality of fields included in said table of said relational database; and displaying, at said computer system and in response to said querying, said multiple data values of said second set in a plurality of entry fields of said data value input form, wherein a data value of said multiple data values of said second set indicates a first data type that categorizes said data value of said first set and is included in an entry field of said plurality of entry fields;

replacing, in said entry field of said data value input form and subsequent to said displaying said data value input form, said data value of said second set with a replacement data value that indicates a second data type that categorizes an update of said data value of said first set, wherein said second data type is different from said first data type;

updating, in a field of said plurality of fields included in said table of said relational database and in response to said replacing, said data value of said second set with said replacement data value that indicates said second data type, wherein a result of said updating said data value of said second set is an association in said table of said relational database between said cell and said replacement data value; and displaying, subsequent to said updating said data value of said second set, said websheet at said computer system via said browser and in an update of said configuration of said websheet, wherein said displaying said websheet includes:

querying said relational database a second time, wherein said querying said second time includes retrieving said replacement data value that indicates said second data type from said field of said plurality of fields included in said table of said relational database; and displaying, in response to said querying said second time, said first set with said data value of said first set replaced by said update of said data value of said first set, wherein said displaying said first set includes displaying said update of said data value of said first set as a data value of a data type indicated by said replacement data value, and wherein said data type indicated by said replacement data value is said second data type.

19. A computer system comprising a processor and a computer-readable memory unit coupled to said processor, said memory unit containing instructions that when executed by said processor implement a method of updating a configuration of a websheet in a network computing environment, said method comprising:

receiving, at said computer system via a browser running on said computer system, a web page having said websheet from a server computing unit, said websheet comprising a plurality of cells associated with a plurality of data values, wherein said plurality of data values is stored in a table of a relational database stored in a storage unit coupled to said server computing unit and comprises:

a first set of data values displayed on said websheet at said computer system in response to said computer system receiving said web page, and a second set of data values associated with said configuration, said second set not being displayed on said websheet at said computer system in response to said computer system receiving said web page, wherein a cell of said plurality of cells includes a data value of said first set and is associated with multiple data values of said second set;

selecting a link on said websheet subsequent to said receiving said web page having said websheet;

exiting said websheet via said browser in response to said selecting said link on said websheet;

receiving, at said computer system via said browser and in response to said selecting said link on said websheet, a data value input form from said server computing unit, said data value input form displaying at said computer system said multiple data values of said second set in a plurality of entry fields of said data value input form via a first query of said database, wherein a data value of said multiple data values of said second set indicates a first data type that categorizes said data value of said first set and is included in an entry field of said plurality of entry fields, wherein said websheet is different from said data value input form;

replacing, in said entry field of said data value input form and subsequent to said receiving said data value input form, said data value of said second set with a replacement data value that indicates a second data type that categorizes an update of said data value of said first set, wherein said second data type is different from said first data type;

displaying, subsequent to said replacing, said websheet at said computer system via said browser and in an update of said configuration provided by a second query of said database, wherein said displaying said websheet includes displaying said first set with said data value of said first set replaced by said update of said data value of said first set, and wherein said displaying said websheet further includes displaying said update of said data value of said first set as a data value of said second data type.

20. A computer program product, comprising a computer-readable storage medium having a computer-readable program code stored therein, said computer-readable program code containing instructions configured to be executed by a processor of a computer system to implement a method of updating a configuration of a websheet in a network computing environment, said method comprising:

receiving, at said computer system via a browser running on said computer system, a web page having said websheet from a server computing unit, said websheet comprising a plurality of cells associated with a plurality of data values, wherein said plurality of data values is stored in a table of a relational database stored in a storage unit coupled to said server computing unit and comprises:
- a first set of data values displayed on said websheet at said computer system in response to said computer system receiving said web page, and
- a second set of data values associated with said configuration, said second set not being displayed on said websheet at said computer system in response to said computer system receiving said web page, wherein a cell of said plurality of cells includes a data value of said first set and is associated with multiple data values of said second set;

selecting a link on said websheet subsequent to said receiving said web page having said websheet;

exiting said websheet via said browser in response to said selecting said link on said websheet;

receiving, at said computer system via said browser and in response to said selecting said link on said websheet, a data value input form from said server computing unit, said data value input form displaying at said computer system said multiple data values of said second set in a plurality of entry fields of said data value input form via a first query of said database, wherein a data value of said multiple data values of said second set indicates a first data type that categorizes said data value of said first set and is included in an entry field of said plurality of entry fields, wherein said websheet is different from said data value input form;

replacing, in said entry field of said data value input form and subsequent to said receiving said data value input form, said data value of said second set with a replacement data value that indicates a second data type that categorizes an update of said data value of said first set, wherein said second data type is different from said first data type;

displaying, subsequent to said replacing, said websheet at said computer system via said browser and in an update of said configuration provided by a second query of said database, wherein said displaying said websheet includes displaying said first set with said data value of said first set replaced by said update of said data value of said first set, and wherein said displaying said websheet further includes displaying said update of said data value of said first set as a data value of said second data type.

\* \* \* \* \*